United States Patent [19]

Thompson et al.

[11] 4,208,737
[45] Jun. 17, 1980

[54] LOW FREQUENCY INERTIA BALANCED DIPOLE HYDROPHONE

[75] Inventors: John H. Thompson, Severna Park; George R. Douglas, Arnold, both of Md.

[73] Assignee: Westinghouse Electric Corp., Pittsburgh, Pa.

[21] Appl. No.: 967,179

[22] Filed: Dec. 6, 1978

Related U.S. Application Data

[63] Continuation of Ser. No. 815,387, Jul. 13, 1977, abandoned.

[51] Int. Cl.² .................................................. H04B 13/00
[52] U.S. Cl. .................................. 367/171; 310/337; 367/174
[58] Field of Search .................................. 340/8-14; 310/329, 330

[56] References Cited

U.S. PATENT DOCUMENTS

| 1,432,945 | 10/1922 | Atwood | 340/8 PC |
| 2,404,784 | 7/1946 | Bostwick | 340/14 |
| 3,187,300 | 1/1965 | Brate | 310/329 |
| 3,727,084 | 4/1973 | Epstein | 310/329 |
| 4,001,765 | 1/1977 | Sims | 340/7 PC |

Primary Examiner—Harold J. Tudor
Attorney, Agent, or Firm—D. Schron

[57] ABSTRACT

A dipole hydrophone having a differential pressure sensing unit, for example, a multi-laminar bender disc, within a liquid filled housing. Two liquid filled acoustic waveguides form extensions of the housing and include pressure sensing ports. A mass of predetermined value is connected to the sensing unit and with a predetermined separation between sensing ports, the mass value is chosen so that the sensing unit response to acceleration is very nearly equal and opposite to its response due to the inertial mass of the liquid.

16 Claims, 26 Drawing Figures

ACCELERATION

ACCELERATION

ACCELERATION

ACCELERATION →

LOW FREQUENCY INERTIA BALANCED DIPOLE HYDROPHONE

This is a continuation of application Ser. No. 815,387, filed July 13, 1977, now abandoned.

BACKGROUND OF THE INVENTION

1. Field of the Invention

The invention in general relates to hydrophones, and in particular to a dipole hydrophone with a low vibration sensitivity, a high acoustic sensitivity and a low flow noise response.

2. Description of the Prior Art

Dipole hydrophones find extensive use in the underwater environment for listening to very low frequency noise as may be produced for example, by a submarine. The dipole hydrophone is positioned at some point in the water, either alone or as a part of an array, and provides an output signal in response to received acoustic signals in accordance with its beam pattern in the form of a figure eight.

Most dipole hydrophones respond directly to particle velocity and any mechanical vibration acceleration from the support structure may tend to provide an unwanted output signal.

In copending application Ser. No. 352,820, filed Apr. 19, 1973, and assigned to the same assignee as the present invention, there is described a dipole hydrophone which utilizes two masses having different ratios of actual mass to added radiation mass with each being connected by means of a multi-laminar magnetostrictive arm to a base member, with the unit including a number of pickups for providing an output signal. This hydrophone significantly reduces the effects of acceleration, however, it does require two matched multi-laminar arms and two matched pickup units.

To eliminate the particle velocity response, a dipole hydrophone has been proposed which responds to the pressure gradient of an acoustic wave by means of two monopoles separated by a half wavelength and connected so that the signals from the monopoles subtract. Although the arrangement has very desirable inertia balancing properties, there are disadvantages. For example, the sensitivity is limited by the thermal noise of the preamplifiers utilized in the signal processing. A difference signal may be extremely small compared with this thermal noise. Further, in order to obtain an accurate output, the monopoles and signal processing channels must be very accurately balanced.

In a somewhat analogous art, a pressure gradient microphone has been proposed which includes a housing containing a differential pressure sensor and includes elongated first and second arms extending from the housing to spaced apart points where the respective pressures are communicated to either side of the differential pressure sensor. Such arrangement, to be described in FIG. 2, is air or gas filled and has a high acoustic sensitivity with low response to flow noise. The arrangement, however, is not suitable for underwater use; however, even if filled with a liquid and operated underwater, the unit would be extremely sensitive to vibrations.

SUMMARY OF THE INVENTION

A pressure gradient dipole hydrophone is provided which has a very low vibration sensitivity, a high acoustic sensitivity, and a low flow noise response. The hydrophone includes a liquid filled housing having a differential pressure sensing means within the housing. Liquid filled acoustic waveguides are coupled to the housing and include respective pressure sensing ports whereby the respective pressures at said ports are communicated to respective sides of the differential pressure sensing means.

The construction of the hydrophone is such that when accelerated, the inertial response of the liquid on the sensing means is approximately equal and opposite to the inertial response of the sensing means due to its mass. In most instances, mass will be added to the sensing element and the distance between pressure sensing ports adjusted until little or no voltage is provided by the sensing means when the hydrophone is vibrated.

BRIEF DESCRIPTION OF THE DRAWINGS

FIG. 9 illustrates an alternate embodiment of the acoustic waveguide extension illustrated in FIGS. 6 and 7;

DESCRIPTION OF THE PREFERRED EMBODIMENTS

Figure 1:
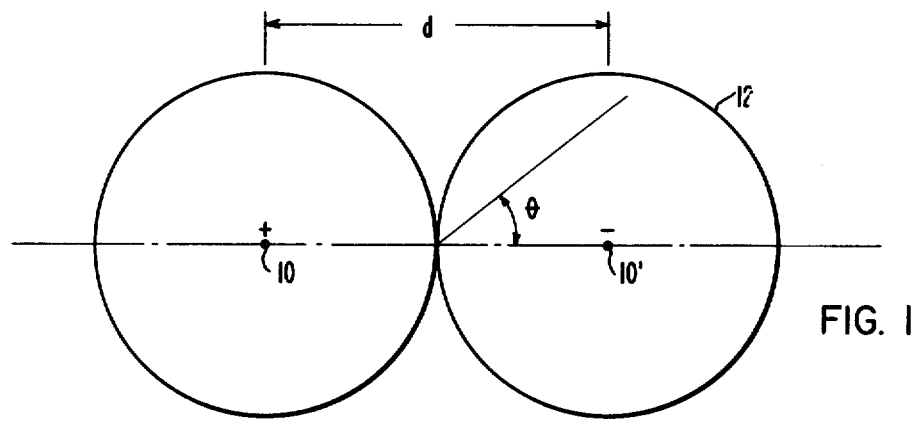
FIG. 1 illustrates the directivity pattern of a dipole hydrophone.

Referring now to FIG. 1, the dipole hydrophone, also known as a doublet transducer, may be represented by two small, closely spaced transducers indicated by points 10 and 10', having opposite polarity. The signals from these two points cancel for equal pressure, thus any net response is due to a pressure gradient across the dipole. If points 10 and 10' are small with respect to the operating wavelength, and if the distance d between them is also small in comparison with the wavelength, for example less than or equal to λ/2, the directivity pattern will be the figure eight pattern, 12, also known as a cosine directivity pattern wherein the response is proportional to the cosine of the angle θ.

Figure 2:
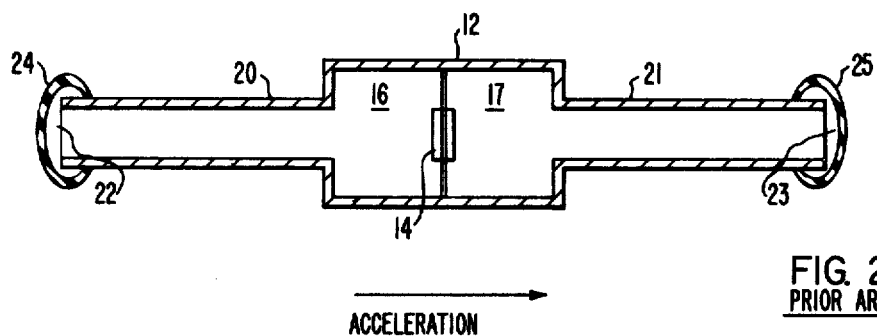
FIG. 2 is an axial, cross-sectional view of a pressure gradient microphone of the prior art.

FIG. 2 illustrates a prior art pressure gradient microphone, as opposed to a hydrophone. The microphone includes a housing 12 with a differential pressure sensor 14 contained therein separating the housing into two distinct chambers 16 and 17. The differential pressure sensor 14 may be in the form of a multi-laminar bender disc made up of a disc of metal sandwiched between two piezoelectric discs.

First and second acoustic waveguides 20 and 21 are coupled to housing 12 and include respective pressure measuring ports 22 and 23 covered by compliant members 24 and 25.

The housing and waveguides are filled with a gas having a high propagation velocity, hydrogen or helium being examples, and the pressures at ports 22 and 23 are communicated to respective sides of the differential pressure sensor 14, which then provides an electrical output signal indicative of any pressure difference.

Figure 2A:
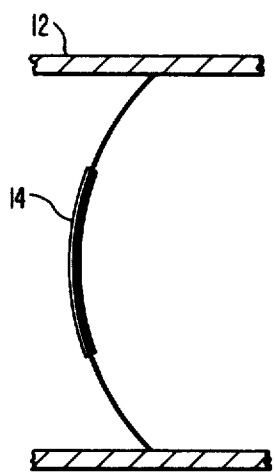
FIG. 2A illustrates the deflection of the differential pressure sensing element of FIG. 2 as a result of its own mass, in response to acceleration of the unit in the direction illustrated.
Figure 2B:
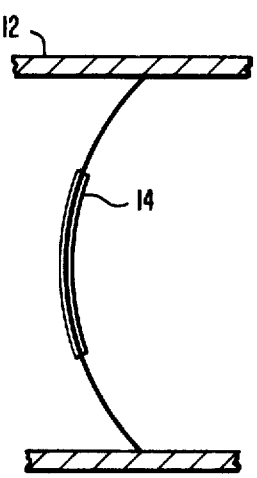
FIG. 2B illustrates its deflection due to liquid inertial force.

The microphone has very high acoustic sensitivity with a very low response to flow noise. However, the unit could not be operated at deep ocean depths since the compliant covers would collapse. Replacing the gas with an electrically insulating liquid results in a dipole hydrophone which has a low response to flow noise, good-sensitivity, but is highly sensitive to vibrations. For example, let it be assumed that the unit is accelerated in the direction indicated. The sensor deflection from its own mass is illustrated in FIG. 2A. As a result of the acceleration, the liquid inertial pressure also operates on the sensor and deflects it as illustrated in FIG. 2B. This deflection illustrated in FIGS. 2A and 2B will cause an unwanted output signal which is due solely to movement or vibration of the hydrophone and not to any meaningful signal.

Figure 3:
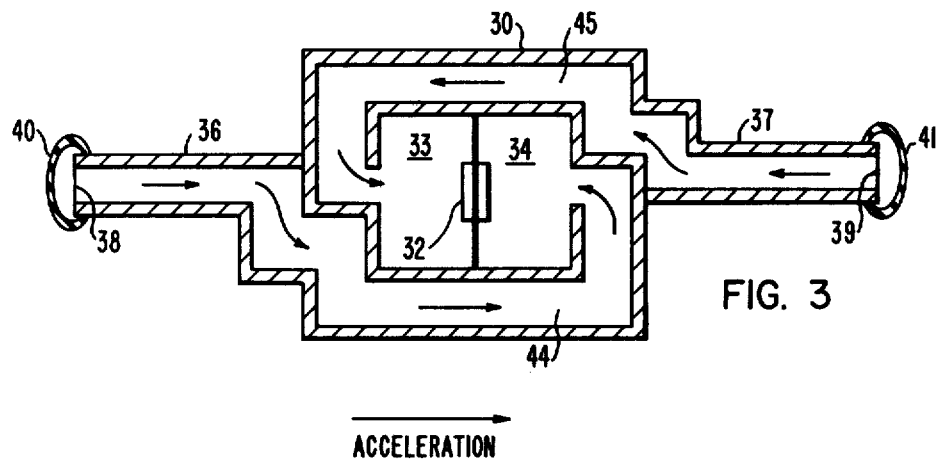
FIG. 3 is an axial cross-sectional view, in simplified form, of an embodiment of the present invention.

FIG. 3 conceptually illustrates one embodiment of the present invention wherein the objectional effects of the liquid inertial pressure are minimized.

The hydrophone of FIG. 3 includes a housing 30 having contained therein a differential pressure sensor 32, such as a multi-laminar bender disc, which separates the housing into two distinct chambers 33 and 34.

Acoustic waveguides 36 and 37 extend from the housing and include respective pressure measuring ports 38 and 39 covered with compliant members 40 and 41. The unit is filled with a transducer fluid such as castor oil and the pressures at pressure measuring ports 38 and 39 are communicated to respective sides of the differential pressure sensor. As opposed to the arrangement of FIG. 2 however, the left acoustic waveguide 36 communicates with the right chamber 34 by means of passageway 44, and the right acoustic waveguide 37 communicates with the left chamber 33 by means of passageway 45.

Figure 3A:
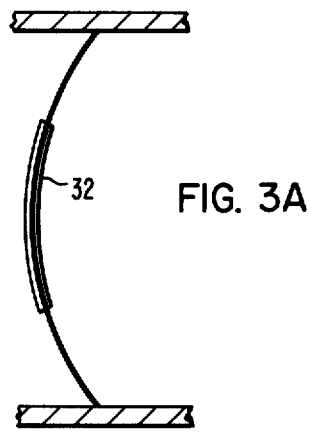
FIG. 3A illustrates the differential pressure sensor deflection as a result of its own mass, in response to acceleration in the direction illustrated
Figure 3B:
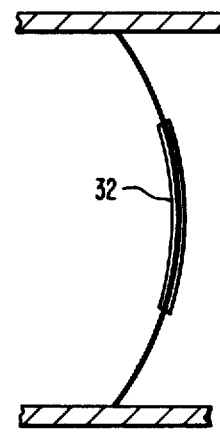
FIG. 3B illustrates its deflection due to liquid inertial force.

If the unit is now accelerated in the direction indicated, the differential pressure sensor, due to its own mass, will deflect as illustrated in FIG. 3A. Due to the novel arrangement, the liquid pressure buildup due to the acceleration acts to deflect the differential pressure sensor in the direction as indicated in FIG. 3B, a direction opposite to that deflection of FIG. 3A. In the present arrangement, the differential pressure measuring device is given a certain mass such that the inertial response of the liquid on the sensor is approximately equal, and opposite, to the inertial response of the sensor due to its mass. When this condition is met, substantially no output signal will be provided by the sensor as a result of acceleration.

FIGS. 4A through 4F depict liquid filled containers to illustrate the principle of fluid pressure. The vertical container of FIG. 4A contains a liquid of height H meters. If the ambient pressure is $P_O$, the pressure $P_H$ at the bottom of the container is $$P_H = P_O = g\rho H \qquad (1)$$

where:

$P_H$ and $P_O$ are measured in newtons/meter$^2$ (Pascals);
g is gravitational acceleration in meters/sec$^2$;
$\rho$ is the density of the liquid in Kg/meter$^3$.

Figure 4A:
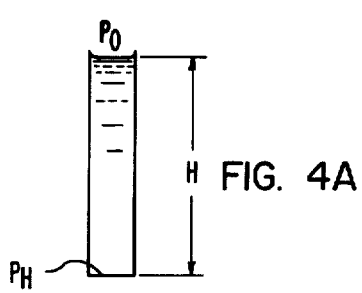
FIGS. 4A through 4F illustrate liquid filled containers to aid in an understanding of the pressure considerations herein.
Figure 4B:
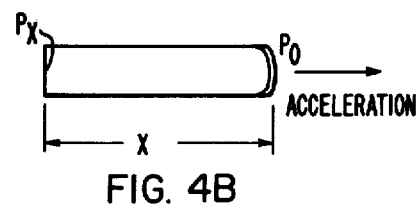

FIG. 4B illustrates a similar liquid filled container tipped on its side and covered, on its right side by a compliant member. If the container is accelerated with an acceleration a, in the direction as illustrated, the pressure $P_X$ at the left end of the container will be $$P_X = P_O + a\rho X \qquad (2)$$

where:

$P_O$ is the ambient pressure acting on the compliant member in Pascals;
X is the length of the fluid column in meters.

Figure 4C:
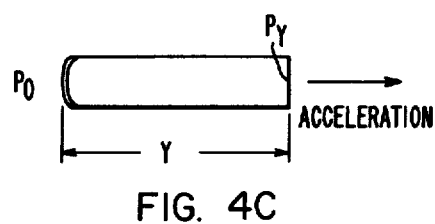
Figure 4D:
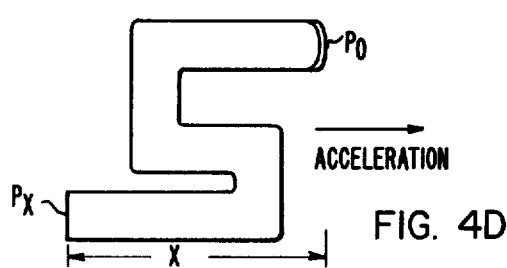
Figure 4:
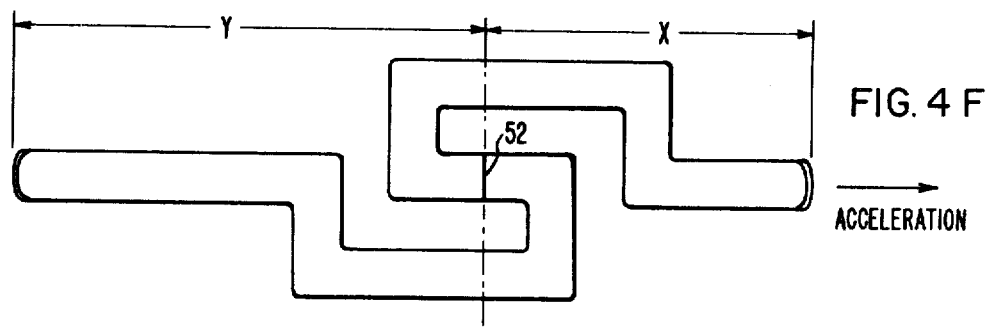

FIG. 4C illustrates the container tipped to the left having a water column of length Y. If the container is accelerated in the same direction as was the case in FIG. 4B, the pressure $P_Y$ at the right end of the container will be $$P_Y = P_O - a\rho Y \qquad (3)$$

It is to be noted that the pressure measurement is not a function of the shape of the container. For example, for the serpentine container illustrated in FIG. 4D, the pressure $P_X$ will be identical to that of FIG. 4B and is defined by Equation (2).

Figure 4E:
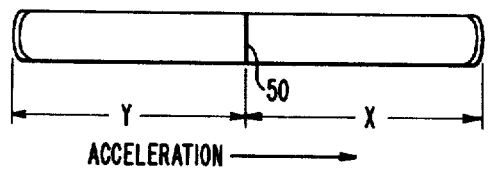

If the two containers of FIGS. 4B and 4C are placed end to end as in FIG. 4E, and the unit accelerated in the direction indicated, the resultant differential pressure P at the interface due to the liquid inertia will be $$P = P_O + a\rho X - (P_O - a\rho Y) \qquad (4)$$

which reduces to $$P = a\rho(X + Y) \qquad (5)$$

If, in FIG. 4E, the junction 50 were replaced by a bender disc, the arrangement would be analogous to the prior art illustrated in FIG. 2. If the containers were curved as illustrated in FIG. 4F and the junction 52 between them replaced by a bender disc, the arrangement would be analogous to that illustrated in FIG. 3.

In the present invention, the total liquid inertial force acting on the sensor is made equal to the inertial force of the sensor assembly. That is, the liquid pressure times the area over which it acts is the force equal to the mass of the disc assembly times its acceleration. If a is the acceleration in meters/sec$^2$, M the mass of the assembly in Kg, and A the area in meters$^2$ over which the fluid is effective:

$$a\rho(X + Y)(A) = Ma \qquad (6)$$

If a bender disc is used and its diameter is d, its effective diameter will be $\frac{8}{9}d$, such that its area will be $$A = (\tfrac{8}{9}d)^2 \pi/4 \qquad (7)$$

Substituting into Equation (6) and cancelling the acceleration terms, the mass of the disc assembly required to counteract the liquid inertia will be approximately $$M = \rho(X+Y)d^2\pi/9 \qquad (8)$$

In all probability the sensor assembly will not have this exact mass so that individual pieces of mass will be added to obtain the quantity derived in Equation (8). As a practical matter then, the resulting unit may be given a predetermined acceleration and if any output voltage is provided due to that acceleration, the value of X and/or Y may be adjusted to trim the apparatus and to minimize any output signal due to vibration.

Figure 5:
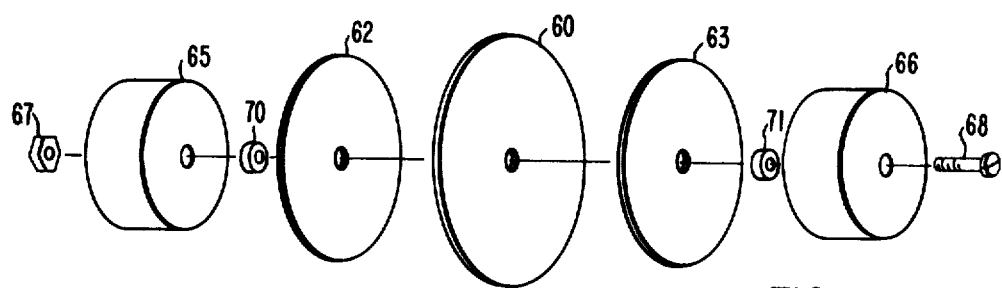
FIG. 5 is an exploded view of one embodiment of a differential pressure sensing means which may be utilized herein.

FIG. 5 illustrates, in an exploded view, a bender disc sensing means which may be utilized herein. The bender disc is a multi-laminar unit including a central metallic disc 60 made for example of aluminum and having a thickness in the order of 0.01 inch. Cemented to either side of disc 60 are piezoelectric discs 62 and 63 also of 0.01 inch thickness. Since the resulting unit in general would not have enough mass to satisfy the equality of Equation (8), additional mass is added in the form of brass weights 65 and 66 and the assembly is held together by means of nut and bolt 67, 68 with the brass weight 65 and 66 being spaced from piezoelectric discs 62 and 63 by means of standoffs 70 and 71.

Figure 6:
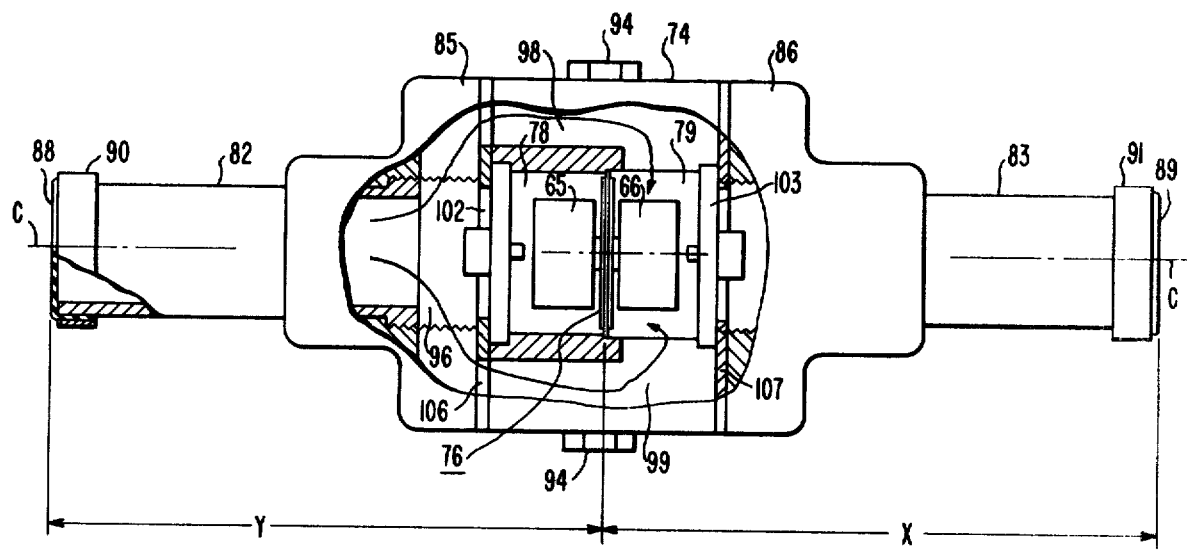
FIG. 6 is a plan view, with a portion broken away, of one embodiment of the present invention.

FIG. 6 is a plan view, with a portion broken away, of a dipole hydrophone constructed in accordance with the teachings herein. The hydrophone includes a housing 74 containing a differential pressure sensing unit 76 identical to that described in FIG. 5 and which divides the interior of housing 74 into two distinct chambers 78 and 79.

First and second acoustic waveguides 82 and 83 extending along a central axis C are coupled to housing 74 by means of coupler portions 85 and 86. The ends of the acoustic waveguides 82 and 83 constitute pressure sensing ports which are covered by respective compliant members 88 and 89 held in place by securing rings 90 and 91.

The distance from the pressure measuring port at the end of waveguide 82 to the center of the sensing unit is designated Y and the distance from the pressure measuring port at the end of acoustic waveguide 83 to the center of the sensing unit is designated X. In order to balance the hydrophone in accordance with Equation (8), the apparatus is constructed and arranged so that distance X or Y or both may be varied. This is accomplished by the threaded engagement of each acoustic waveguide with respective coupler portions 85 and 86. Since the hydrophone is liquid filled, if one or both of the waveguides is screwed in to shorten a distance, one of a plurality of machine screws 94 is removed to allow for liquid overflow. Conversely, if one or both of the waveguides is moved to increase a distance, then additional liquid may be added. If X and Y are of equal lengths and $(X+Y)<\lambda/2$, the resulting beam pattern will be a pure dipole as illustrated in FIG. 1. If X and Y are of unequal lengths or if $(X+Y)>\lambda/2$, other lobes begin to appear in the beam pattern.

For the plan view illustrated, coupler portion 85 includes an elongated horizontal chamber or opening 96 by means of which liquid in acoustic waveguide 82 is communicative with chamber 79 via passageways 98 and 99.

Although not illustrated in FIG. 6, an elongated vertical chamber or opening in coupler portion 86 will communicate liquid in acoustic waveguide 83 through similar passageways to chamber 78. Liquid baffles 102 and 103 in conjunction with gaskets 106 and 107 ensure that the liquid in the left waveguide is communicative with the right side of the sensor, and the liquid in the right waveguide is communicative with the left side of the sensor as was explained with respect to FIG. 3.

Figure 7:
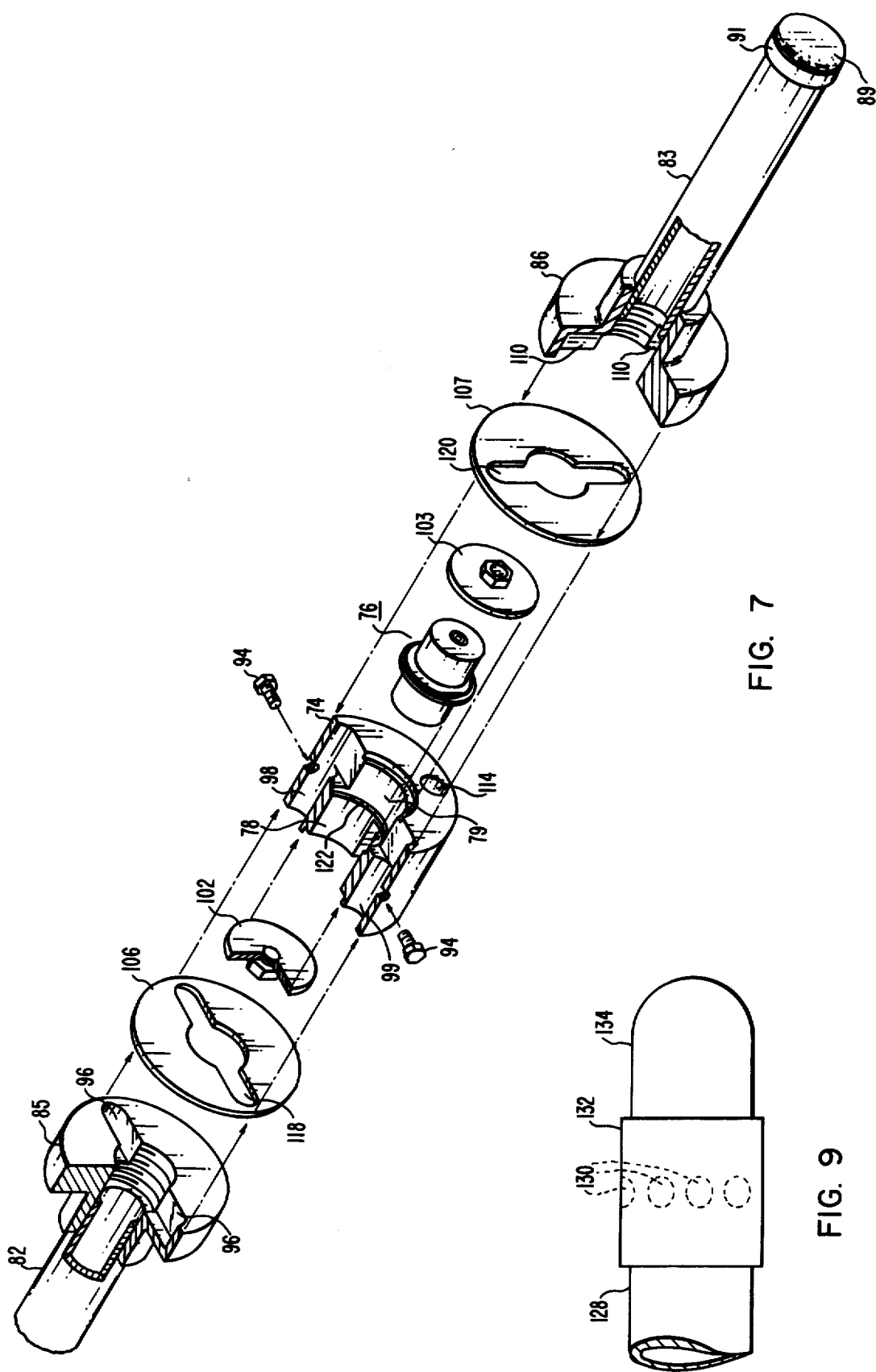
FIG. 7 is an exploded view of the hydrophone of FIG. 6.
Figure 8:
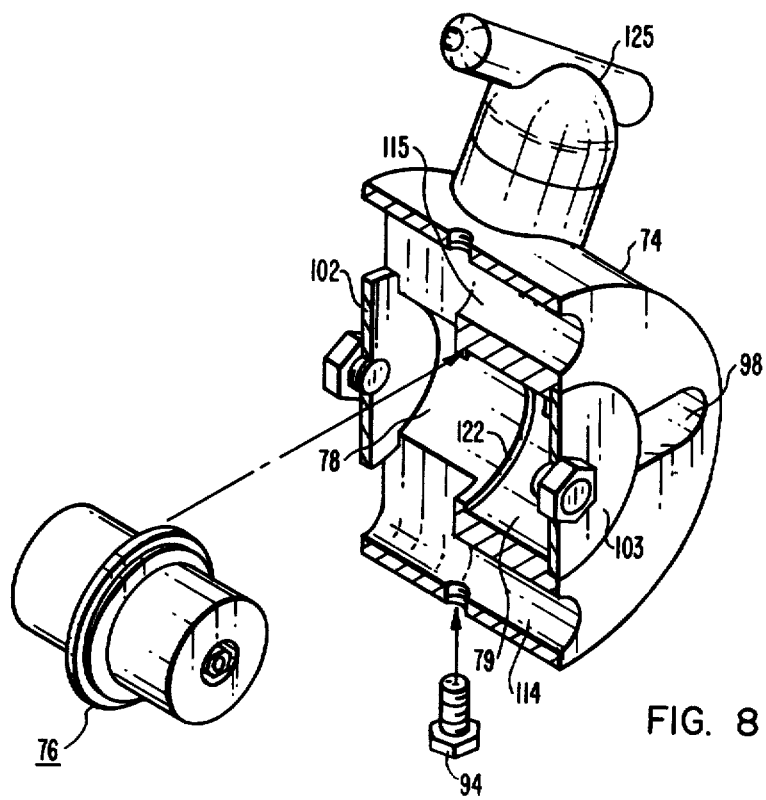
FIG. 8 is a sectional view of the portion of the housing illustrated in FIGS. 6 and 7.

FIG. 7 illustrates an exploded view of the hydrophone of FIG. 6 with a horizontal cross-section taken through housing 74; and FIG. 8 illustrates the housing with a vertical cross-section. All of the elements of FIG. 6 are identified in the exploded view of FIG. 7 which additionally illustrates the mentioned elongated vertical chamber or opening designated 110 in coupler portion 86. Liquid in acoustic waveguide 83 is then communicative with left chamber 78 via passageways 117 and 115, better illustrated in FIG. 8. As can be seen in FIG. 7, gaskets 106 and 107 include elongated slits 118 and 120 which line up with the respective elongated horizontal chamber 96 and elongated vertical chamber 110.

In the actual construction of the hydrophone, the edge of the central metallic disc of the sensor unit 76 would be secured to the rim portion 122 such as by epoxy. Electrical connection to the sensor unit would then be made through waterproof electrical connector 125 mounted on housing 74. Although the acoustic waveguides are illustrated as being threadedly engaged with the coupler portions 85 and 86 to vary the distance between an acoustic port and the sensing unit, other means of varying this distance may be provided such as by telescopic sections or by a threadedly engaged end section of waveguide, by way of example.

If the hydrophone is vibrated longitudinally, that is in an axial direction, there is a chance of acoustic pressure buildup at the pressure measuring ports 88 and 89. In order to reduce this pressure buildup, the acoustic waveguide may be fabricated in accordance with the design illustrated in FIG. 9. The end portion of an acoustic waveguide 128 is illustrated and includes measuring ports 130 covered by a compliant member 132. The waveguide includes an extension 134 beyond the pressure measuring ports 30, and which extension minimizes, if not eliminates, the pressure buildup problem.

Figure 10:
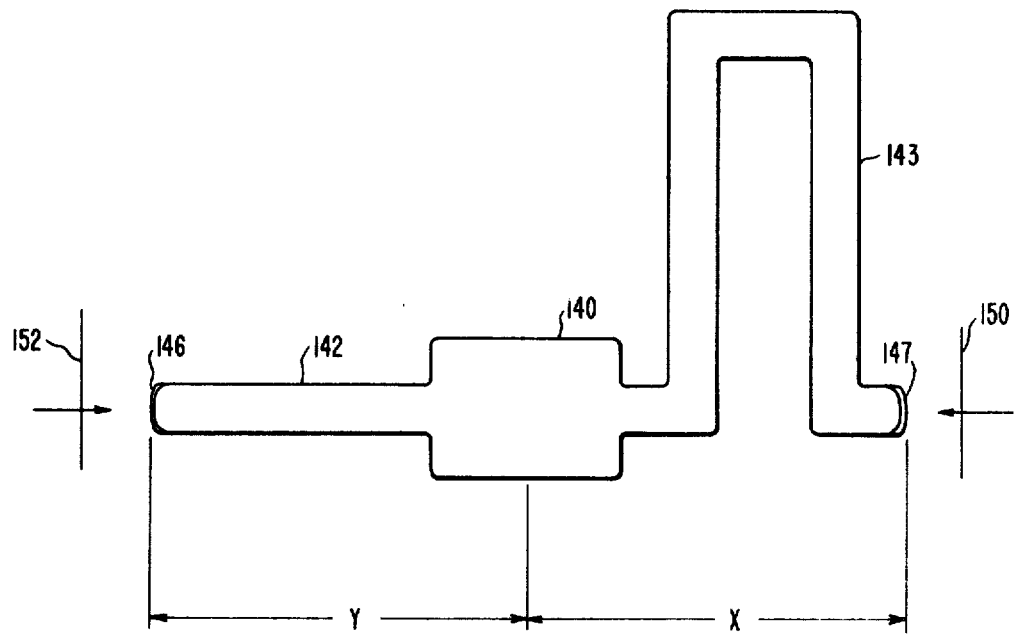
FIGS. 10 and 10A are simplified versions of another embodiment of the present invention.
Figure 10A:
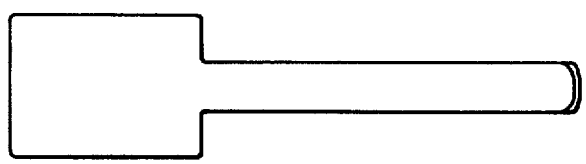
Figure 11:
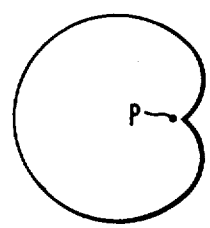
FIG. 11 is the beam pattern obtained with the apparatus of FIG. 10.

FIG. 10 illustrates another embodiment of the invention wherein the hydrophone depicted has associated therewith the well known cardioid beam pattern as illustrated in FIG. 11. The hydrophone includes a housing 140 which contains a differential pressure sensing means as previously illustrated, and first and second acoustic waveguides 142 and 143 extend from the housing to respective pressure measuring ports 146 and 147. The axial distance from measuring port 146 to the center of the sensing unit is Y and the axial distance from measuring port 147 to the center of the sensor unit is X. The acoustic path length, however, from measuring port 146 to the sensing element is greater than X by virtue of the U-shaped bend. Let it be assumed that $\tau_1$ is the time it takes a pressure wave to travel in waveguide 143 from port 147 to the sensor and $\tau_2$ the time for a pressure wave to travel in waveguide 142 from port 146 to the sensor. If $\tau_3$ is the time it takes for a pressure wave to travel from port 147 to port 146 externally in the water (distance X+Y) then in general a cardioid beam pattern will be provided if the waveguide liquid and waveguide lengths are chosen such that $\tau_1=\tau_2+\tau_3$. Thus, as a variation, by eliminating one waveguide as in FIG. 10A, $\tau_2$ is made substantially equal to zero and a cardioid pattern will result, while still maintaining inertial balancing.

Suppose by way of example in FIG. 10 that a pressure wave as indicated by line 150 is traveling in an axial direction relative to the hydrophone, from right to left as indicated by the arrow. X is chosen to be equal to Y and the length of waveguide 143 is chosen to be 3X (from port to sensor). The pressure wave must travel 3X within waveguide 143 until it reaches one side of the pressure differential sensor. After the pressure wave 150 passes measuring port 147, it will travel a distance of 2X in the water until it reaches measuring port 146 after which the pressure is communicated to the other side of the sensor after a travel of X in waveguide 142. It is seen therefore that the same pressure signal arrives at both sides of the differential pressure sensor at the same time due the chosen path lengths and therefore no output signal will be provided. This is in conformance with the beam pattern of FIG. 11 wherein the hydrophone is assumed positioned at point p. A wave emanating from the opposite direction as indicated by pressure wave 152 will cause a pressure differential at the sensing unit and it will be a maximum. Waves emanating from various other directions will cause an output signal as governed by the beam pattern.

Although both acoustic waveguides 142 and 143 do not extend along the same axial line, the hydrophone will still provide inertial balancing as previously described. In determining the mass to be added to the differential pressure sensing arrangement, the form of Equation (8) may still be utilized with X=Y. Acoustic waveguide 143 is illustrated by way of example as having a single U-shaped bend. A multiple bend arrangement is more practical to conserve space and the cardioid pattern will be provided as long as the multiple bend waveguide is of a path length which will ensure cancellation of a pressure wave such as 150.

With the critical value between path lengths, there is a possibility that a standing wave in an acoustic waveguide may be generated and degrade the response of the hydrophone. Accordingly, in order to prevent these standing waves, the acoustic waveguides are terminated at their ports with an acoustic resistance which is made equal to the characteristic resistance of the waveguide. This is completely analogous to terminating a transmission line in its characteristic impedance to prevent standing waves.

Figure 12:
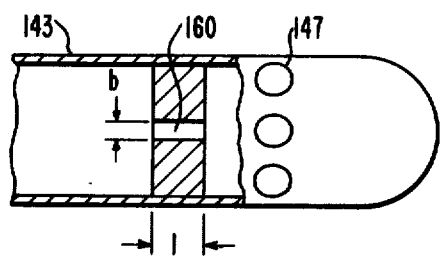
FIG. 12 is an axial cross-sectional view through an acoustic waveguide for the embodiment of FIG. 10.

FIG. 12 illustrates one example of an acoustic resistance terminating an acoustic waveguide, waveguide 143. The acoustic resistance is formed by a capillary opening 160 of a length l and of a diameter b. The characteristic impedance of the waveguide is given by the relationship $$Z=\rho C\sigma \qquad (9)$$

where:
Z is the characteristic impedance in ohms;
$\rho$ is the density of the waveguide liquid in Kg/meter³;
C is the speed of sound in the liquid in meters/sec; and
$\sigma$ is the cross-sectional area in meters².

The acoustic resistance of the capillary 160 is given by the relationship $$R=(k\mu l)/b^4 \qquad (10)$$

where:
R is the acoustic resistance in ohms;
k is a constant;
$\mu$ is viscosity of the waveguide liquid in Pascal-seconds;
l is the length of the capillary in meters;
b is the diameter of the capillary in meters.

Thus, knowing the waveguide liquid characteristics and waveguide area, the characteristic impedance may be determined in accordance with Equation (9).

The capillary is then designed according to Equation (10) where the value of R is made equal to the value of Z calculated from Equation (9).

Figure 13:
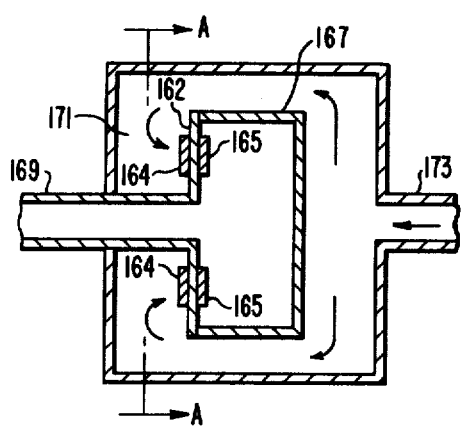
FIG. 13 is an axial cross-sectional view of a simplified version of another embodiment of the present invention.
Figure 13A:
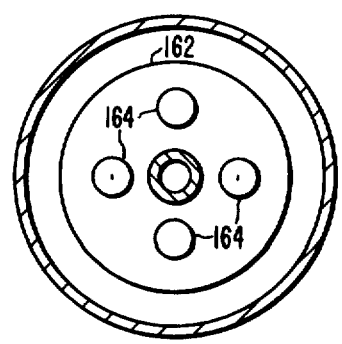
FIG. 13A is a view along line AA of FIG. 13.

The differential pressure sensor has been described by way of example as a multi-laminar bender disc. The sensor however, can be any one of a variety of differential pressure sensors such as a condenser microphone, a velocity sensor on a disc, a group of sensors, or even cylinders, to name a few. FIG. 13, and FIG. 13A which is a view along line A—A of FIG. 13, illustrate a group of sensors. A metallic disc 162 having a central aperture includes a plurality of piezoelectric discs 164 on one side thereof and a similar plurality of piezoelectric discs 165 on the other side thereof. Disc 162 in conjunction with container 167 forms a compartment which is communicative with acoustic waveguide 169. Another chamber 171 is communicative with the other acoustic waveguide 173. The principle of operation is identical to that already described in that an axial acceleration or axial component of acceleration to the right will tend to cause a deflection of the sensing unit to the right due to the liquid, whereas an axial acceleration or axial component of acceleration to the left will tend to cause a deflection of the sensing unit to the left. By proper choice of added weight, inertial balancing may be accomplished.

Figure 14:
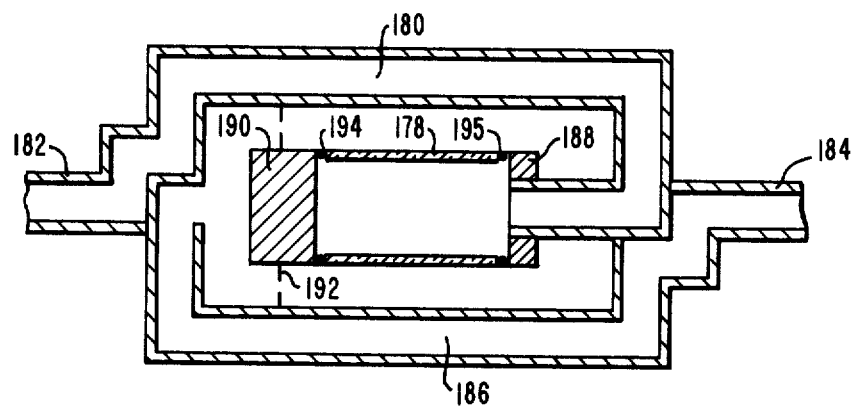
FIGS. 14 and 15 illustrate another type of differential pressure sensing element in the form of a cylinder.

FIG. 14 illustrates an arrangement which utilizes as the active element, a piezoelectric cylinder 178. By means of passageway 180, the left acoustic waveguide 182 is communicative with the inside of cylinder 178 whereas the right acoustic waveguide 184 is communicative with the outside of the piezoelectric cylinder via passageway 186. Piezoelectric cylinder is positioned between an end cap 188 and an added mass 190 supported by means of a spider 192. Compliant rings 194 and 195 between the cylinder and mass 190 and end cap 188 allow for normal transducer action.

The operation of the embodiment of FIG. 14 is such that when accelerated, the mass 190 generates an axial stress causing the generation of a voltage which is in opposition to the voltage generated by the circumferential stressing due to the liquid inertia force.

The voltage $E_O$ produced as a result of the liquid inertia is $$E_O = \tfrac{1}{2} P d_m g_{31} \qquad (11)$$

where:
P is the pressure difference across the cylinder wall in Pascals;
$d_m$ is the mean diameter of the cylinder in meters;
$g_{31}$ is the piezoelectric constant for the radially poled cylinder in (volts-meters/newton)$\times 10^{-3}$.

Substituting the value of P from Equation (5)

$$E_O = \tfrac{1}{2} a p(X+Y) d_m g_{31} \quad (12)$$

where:

X and Y are the respective linear distances from the right and left acoustic pressure measuring ports to the center of the cylinder.

The voltage $E_m$ generated from the acceleration a of the sensor unit is given by the relationship $$E_m = -(Mag_{31}/\pi d_m) \quad (13)$$

where:

M is the value of mass in Kg of the cylinder 178 and mass 190.

The value of $E_O$ is equated to $E_m$ so that the total output voltage due to the acceleration is zero. From Equations (12) and (13)

$$\tfrac{1}{2} a p(X+Y) d m g_{31} = -(-Mag_{31}/\pi d_m) \quad (14)$$

Cancelling the "a" terms and solving for mass M $$M = \tfrac{1}{2} p(X+Y) \pi d_m^2 \quad (15)$$

Equation (15) therefore gives the value, to a good approximation, of the total mass needed for complete inertial balancing and knowing the mass of the cylinder 178, the required added mass may then be determined. As was the case with respect to the embodiment previously described, the unit may be given a predetermined acceleration and the distance X or the distance Y be adjusted so that the total output voltage due to such acceleration is substantially zero.

Figure 15:
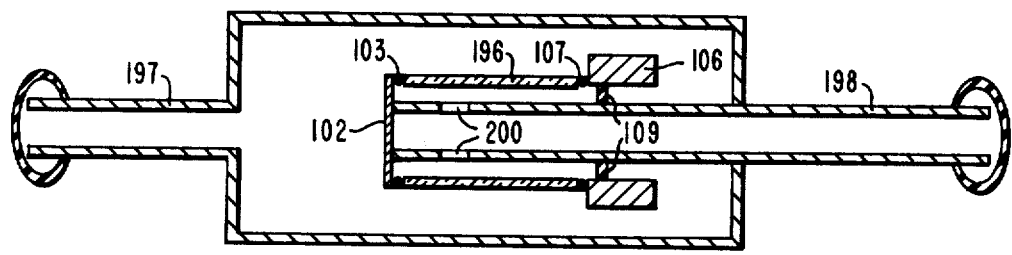

FIG. 15 illustrates another embodiment utilizing a piezoelectric cylinder 196 and wherein the left acoustic waveguide 197 is communicative with the outside of the cylinder and the right acoustic waveguide 198 is communicative with the inside of the cylinder by way of fluid ports 200. The cylinder is connected to an end cap 102 by way of compliant ring 103 and is connected to a mass 106 by way of compliant ring 107. A diaphragm 109 isolates the inside of the cylinder from fluid communication with the outside.

It is recognized that for certain deployments the hydrophones may experience other than linear acceleration. Thus where angular acceleration will be encountered the hydrophones should be designed to be symmetrical about a longitudinal axis as for example would be the construction of the embodiments of FIGS. 6, 13, 14 and 15 (but not that of FIG. 10).

For optimum inertial balancing in the linear acceleration case, as is done in all embodiments described herein, there should be no section of waveguide which would cause a differential output signal due to uncompensated liquid pressure on the sensor. For example a single right angle turn in one waveguide but not the other would not necessarily cause an output when the hydrophone is accelerated longitudinally, but would cause an output of acceleration were along a direction perpendicular to the longitudinal axis.

We claim as our invention:

1. A hydrophone comprising:
 (A) a liquid filled housing;
 (B) differential pressure sensing means within said housing and having a certain mass;
 (C) liquid filled means in fluid communication with said sensing means for communicating the pressure at spaced apart locations to said sensing means; and
 (D) said hydrophone being constructed and arranged that, when accelerated, the inertial response of said liquid on said sensing means is approximately equal and opposite to the inertial response of said sensing means due to said mass.

2. A hydrophone comprising:
 (A) a liquid filled housing extending along a central axis;
 (B) differential pressure sensing means within said housing, coaxial with said axis and having first and second pressure sensing sides;
 (C) liquid filled means for communicating the pressure at spaced apart locations to opposite sides of said sensing means; and
 (D) said hydrophone being constructed and arranged that, when accelerated, the resultant inertial force of said liquid acts on one of said sides in the same direction as the axial component of said acceleration.

3. Apparatus according to claim 2 which includes:
 (A) weight means added to said sensor means and being of such value as to balance said inertial force of said liquid.

4. A hydrophone comprising:
 (A) a housing;
 (B) a differential pressure sensing means within said housing defining left and right chambers;
 (C) said sensing means having left and right pressure sensing sides;
 (D) left and right acoustic waveguides coupled to said housing and having respective pressure sensing ports;
 (E) a liquid contained within said waveguides and housing; and
 (F) said housing including passageways so as to communicate the liquid and sensed pressure of said right waveguide to said left chamber and left pressure sensing side, and to communicate the liquid and the sensed pressure of said left waveguide to said right chamber and right pressure sensing side.

5. A hydrophone comprising:
 (A) a housing;
 (B) a differential pressure sensing means within said housing and defining first and second separate chambers;
 (C) first and second acoustic waveguides coupled to said housing and having respective pressure sensing ports;
 (D) a liquid contained within said waveguides and housing communicating the pressures at said ports to respective ones of said separate chambers;
 (E) said sensing means having a certain mass that, when said hydrophone is accelerated said sensing means tends to provide a first output voltage of a first polarity;
 (F) said sensing means tending to provide a second output voltage of opposite polarity in response to the inertial force of said liquid, on said sensing means due to said acceleration; and
 (G) said mass being of such value that said first and second output voltages are approximately equal so as to tend to cancel the effect of said acceleration.

6. Apparatus according to claim 5 wherein:

(A) at least one of said waveguides is adjustable so as to vary the linear distance between its measuring port and said sensing means.

7. Apparatus according to claim 6 wherein:
(A) said housing includes a liquid filled aperture to allow for overflow of said liquid when said distance is decreased and to allow for liquid addition when said distance is increased.

8. Apparatus according to claim 5 wherein:
(A) said pressure sensing port of a waveguide is at the end of said waveguide.

9. Apparatus according to claim 5 wherein:
(A) each said waveguide has a closed end; and
(B) said pressure sensing ports are displaced from said ends, toward said housing.

10. Apparatus according to claim 5 wherein:
(A) said sensing means is a multi-laminar bender disc and which includes weight added to either side of said disc.

11. Apparatus according to claim 5 wherein:
(A) said sensing means is a piezoelectric cylinder.

12. Apparatus according to claim 5 wherein:
(A) the linear distance from the port in one said waveguide to said sensing means is equal to the linear distance from the port in the other said waveguide to said sensing means.

13. Apparatus according to claim 5 wherein:
(A) the linear distance from the port in one said waveguide to said sensing means is greater than the linear distance from the port in the other said waveguide to said sensing means.

14. Apparatus according to claim 12 wherein:
(A) the length of one said waveguide is greater than the length of the other said waveguide.

15. Apparatus according to claim 14 wherein:
(A) said lengths are in the ratio of 3:1.

16. Apparatus according to claim 5 wherein:
(A) said housing and waveguides are symmetrically disposed about a longitudinal axis.

* * * * *